United States Patent
Chou

(10) Patent No.: US 10,298,095 B2
(45) Date of Patent: *May 21, 2019

(54) MOTOR WITH HEAT DISSIPATION STRUCTURE

(71) Applicant: Wen-San Chou, Tainan (TW)

(72) Inventor: Wen-San Chou, Tainan (TW)

( * ) Notice: Subject to any disclaimer, the term of this patent is extended or adjusted under 35 U.S.C. 154(b) by 215 days.

This patent is subject to a terminal disclaimer.

(21) Appl. No.: 15/192,703

(22) Filed: Jun. 24, 2016

(65) Prior Publication Data

US 2017/0005547 A1 Jan. 5, 2017

(51) Int. Cl.
*H02K 9/06* (2006.01)
*H02K 5/20* (2006.01)
*F04B 35/04* (2006.01)
*F04B 39/06* (2006.01)
*H02K 9/28* (2006.01)

(52) U.S. Cl.
CPC ............ *H02K 9/06* (2013.01); *F04B 35/04* (2013.01); *F04B 39/066* (2013.01); *H02K 5/20* (2013.01); *H02K 9/28* (2013.01)

(58) Field of Classification Search
CPC ............ H02K 9/06; H02K 5/20; H02K 5/225; H02K 5/26; H02K 27/00
USPC ........ 310/62–63, 71, 89, 238–239, 400, 416, 310/417
See application file for complete search history.

(56) References Cited

U.S. PATENT DOCUMENTS

| | | | | |
|---|---|---|---|---|
| 2,154,146 A * | 4/1939 | Becker | ............ | H02K 1/185 310/407 |
| 3,081,411 A * | 3/1963 | Wiley | ............ | H02K 5/04 29/598 |
| 3,701,911 A * | 10/1972 | Hallerback | ............ | H02K 5/15 310/60 R |
| 4,853,576 A * | 8/1989 | Mayumi | ............ | H02K 5/145 29/597 |
| 5,563,462 A * | 10/1996 | Strobl | ............ | H02K 5/145 310/51 |
| 6,040,645 A * | 3/2000 | Lynch | ............ | H02K 3/04 310/227 |
| 8,421,317 B2 * | 4/2013 | Jiang | ............ | H02K 5/148 310/239 |
| 9,071,113 B2 * | 6/2015 | Abe | ............ | H02K 5/225 |
| 2013/0078119 A1 * | 3/2013 | Chou | ............ | F04B 35/01 417/374 |

* cited by examiner

Primary Examiner — Burton S Mullins

(57) ABSTRACT

A motor includes a housing, a front cover, a rotating shaft, and a cooling fan. The front cover is formed with multiple air guiding fins and multiple inlet holes. The housing defines at least one communication hole at its surrounding wall. In use, a central portion of the air current generated by the cooling fan can be guided by the air guiding fins to pass through the inlet holes to enter the motor's housing. An outer portion of the air current can flow along the outer surface of the housing. The way of dissipating heat through multiple paths allows the heat generated in the motor to be dissipated more effectively, so that heat is not easy to accumulate in the motor, and thus the performance and service life of the motor can be increased.

4 Claims, 7 Drawing Sheets

MOTOR WITH HEAT DISSIPATION STRUCTURE

TECHNICAL FIELD OF THE INVENTION

The present invention relates to a motor with a heat dissipation structure and, more particularly, to a motor which can effectively dissipate the heat generated in its housing through multiple paths, so that heat is not easy to accumulate in the motor's housing, and thus the performance and service life of the motor can be increased.

DESCRIPTION OF THE PRIOR ART

In today's industry, motors are one of commonly used devices for providing mechanical power. However, while a motor is running, heat is easy to accumulate in the motor's housing. If the heat is not timely dissipated, the magnetic field provided by the magnets in the motor's housing will decrease, so that the performance of the motor can be gradually reduced. Besides, when the temperature in the motor rises to a certain level, the coils or enamel wires in the motor can be damaged, and this may cause a short circuit, and thus the motor may burn out. For preventing such a problem, a motor is usually provided with a cooling fan. However, the air current generated by the cooling fan of the motor can merely flow along the outer surface of the motor's housing, but cannot flow into the interior of the motor, and thus the capacity of dissipating the heat generated in the motor is limited. The problem of heat accumulation in the motor's housing has not yet been solved completely.

SUMMARY OF THE INVENTION

One object of the present invention is to provide a motor which can effectively dissipate heat therein. The motor generally includes a housing, a front cover, a rotating shaft, and a cooling fan. The housing defines therein an inner space with a front opening. The front cover, which closes the front opening of the housing, is pressed to form a plurality of air guiding fins and a plurality of inlet holes corresponding to the air guiding fins. As such, a central portion of the air current generated by the cooling fan can be guided by the air guiding fins to pass through the inlet holes of the front cover, thus entering the housing, whereby the heat generated in the motor can be dissipated effectively.

According to one feature of the present invention, the surrounding wall of the housing defines at least one communication hole, through which the air within the housing can flow into ambient environment. In one embodiment, while the motor is running, the air current having entered the housing can flow out of the housing via the communication hole, so that the temperature within the motor's housing can be reduced effectively.

According to one advantage of the present invention, the motor can be used in a high-temperature environment without being damaged. In a test, the motor was continuously operated in a closed space of 70 degrees C. for a long time without burning out.

Other objects, advantages, and novel features of the present invention will become more apparent from the following detailed description when taken in conjunction with the accompanying drawings.

DETAILED DESCRIPTION OF THE PREFERRED EMBODIMENTS

Since the structure and operation of a motor has been known widely, a detailed description for the constituent parts thereof is not provided in the following paragraphs.

Figure 1:
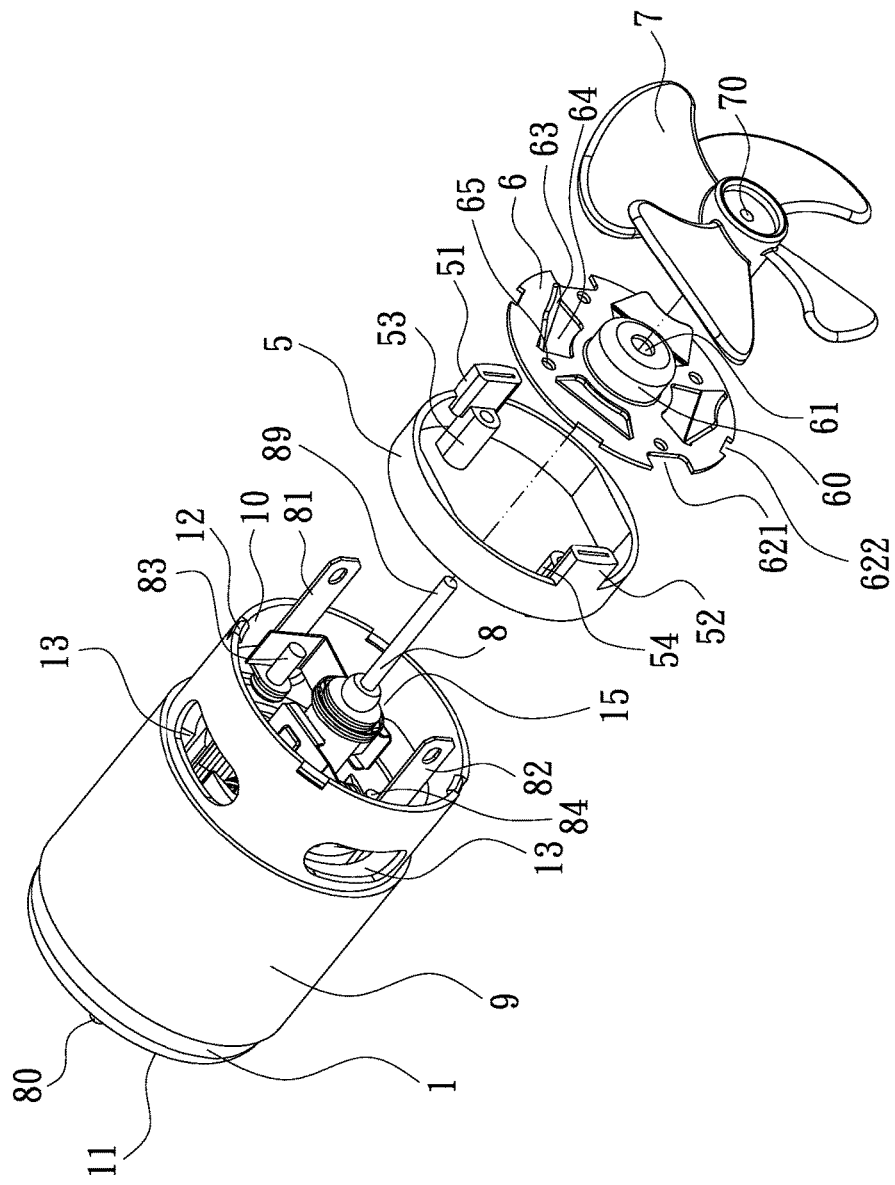
FIG. 1 shows an exploded view of a motor according to one embodiment of the present invention.
Figure 2:
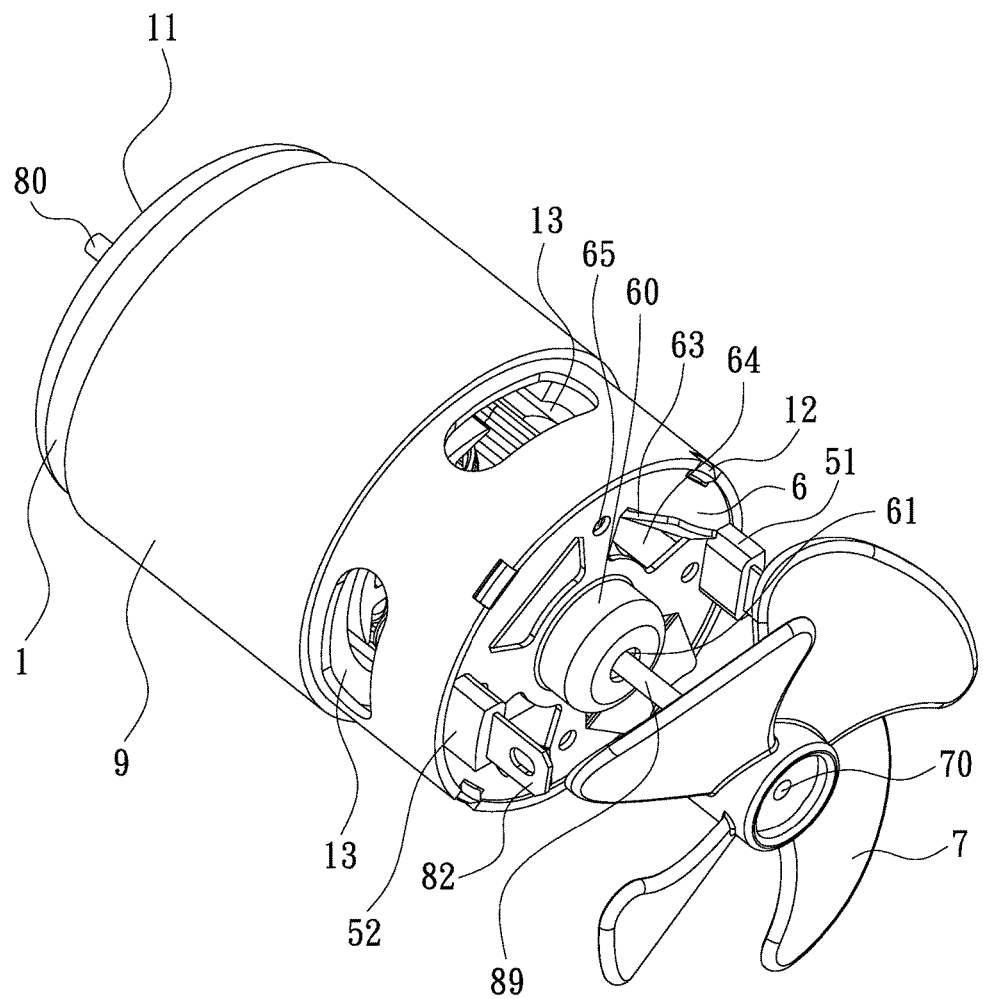
FIG. 2 shows a 3-dimensional view of the motor.
Figure 3:
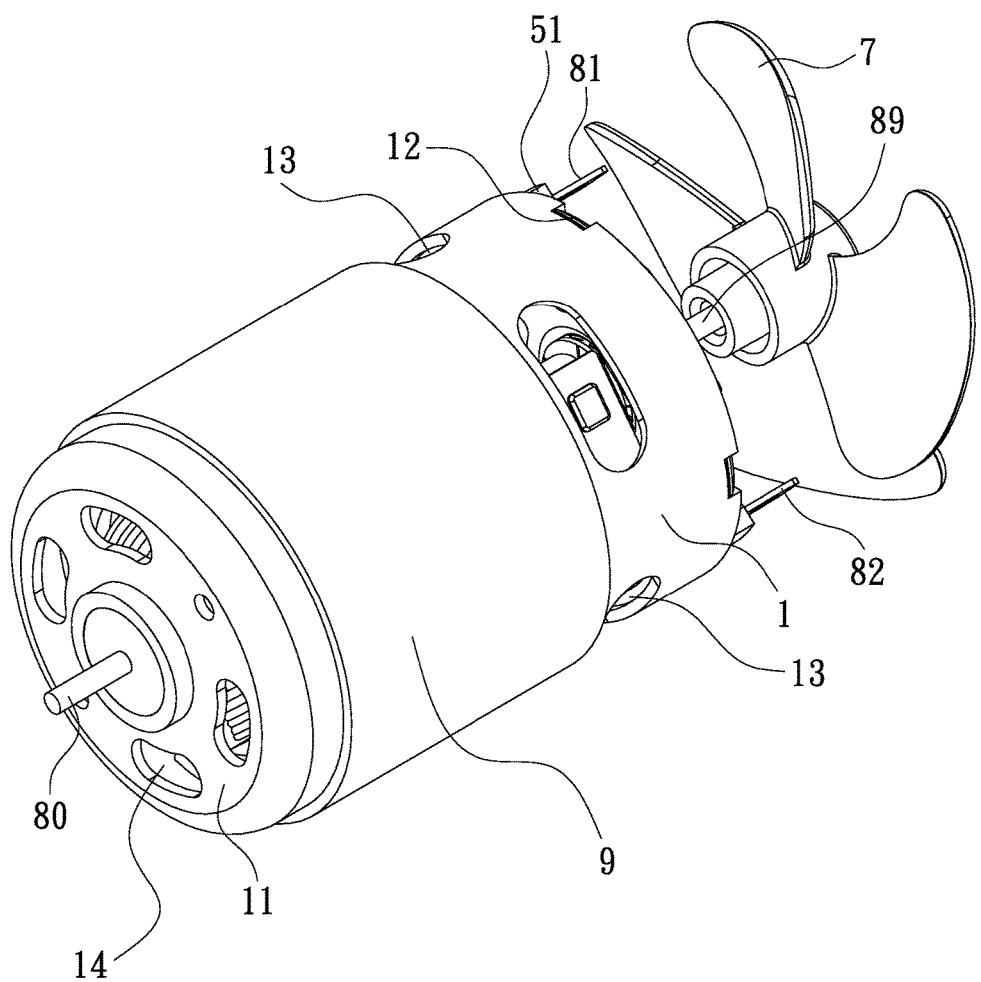
FIG. 3 shows another 3-dimensional view of the motor, which is viewed from a different angle than FIG. 2.
Figure 6:
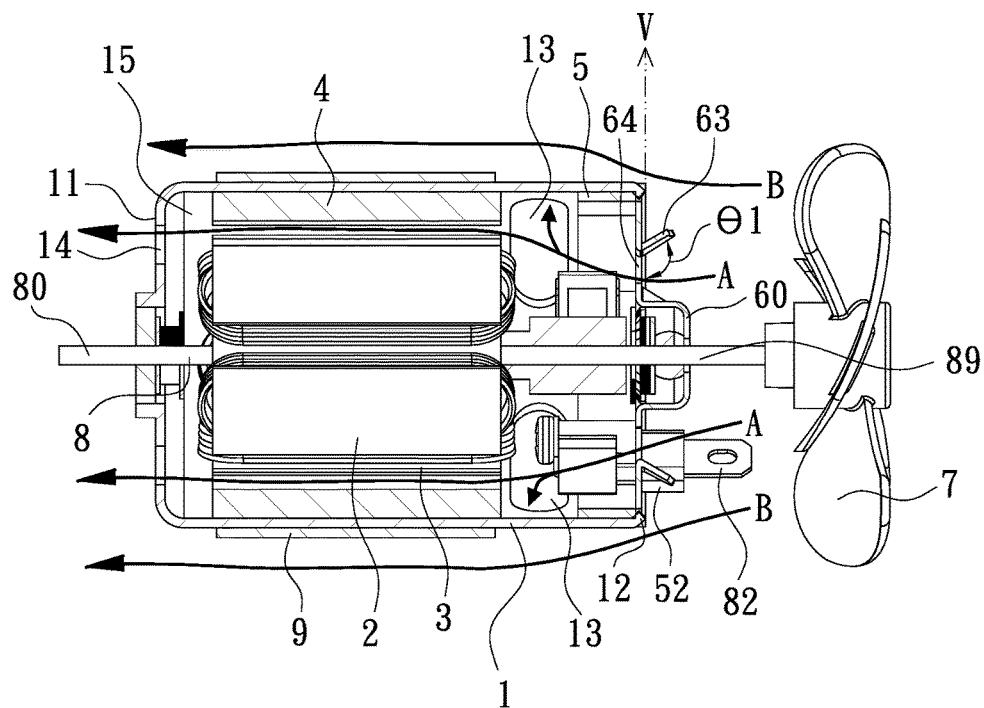
FIG. 6 shows a sectional view of the motor, which demonstrates a first airflow path (A) and a second airflow path (B) for the air current for dissipating the heat generated in the motor.

Referring first to FIGS. 1 through 3, a motor according to one embodiment of the present invention is shown, which generally includes a housing 1, a mounting collar 5, a front cover 6, a rotating shaft 8, and a cooling fan 7. The housing 1 defines therein an inner space 15 with a front opening 10 and has a rear closure wall 11 opposite to the front opening 10. The housing 1 is provided with a plurality of hooks 12 at its front edge which defines the front opening 10. The rear closure wall 11 defines a central hole, in which a bearing may be mounted, and a plurality of outlet holes 14 around the central hole. The surrounding wall of the housing 1 defines a plurality of communication holes 13, through which the air within the housing 1 can flow into ambient environment. Furthermore, a rotor 2, coils 3 and magnets 4, which are necessary elements for a motor, are provided in the inner space 15 of the housing 1 (see FIG. 6). The rotating shaft 8 is mounted across the inner space 15 of the housing 1, wherein the rotating shaft 8 has a first end 80 which is inserted through the central hole of the rear closure wall 11 for connecting with a transmission mechanism (not shown) for providing necessary mechanical power. The rotating shaft 8 has a second end 89 which is inserted out of the front opening 10 of the housing 1 to be fitted with the cooling fan 7, as will be further illustrated below. A magnetically permeable sleeve 9, which can be made of metal, is closely fitted around the outer surface of the housing 1, to increase the performance of the motor.

The mounting collar 5 has two sheaths 51, 52 and two mounting tubes 53, 54, the sheaths 51, 52 extending from one peripheral edge of the mounting collar 5 and parallel to a central axis of the mounting collar 5, the mounting tubes 53, 54 extending from an opposite peripheral edge of the mounting collar 5 and parallel to the central axis of the mounting collar 5, wherein the two sheaths 51, 52 allow two electrical terminal blades 81, 82 provided in the housing 1 to insert therethrough, while the two mounting tubes 53, 54 allow two fixing dowel rods 83, 84 provided in the housing 1 to slide therein.

The front cover 6, which is substantially disk-shaped, has a central hub 60 defining a central hole 61 and has a peripheral portion formed around the central hub 60. The front cover 6 is pressed to form a plurality of air guiding fins 63, which are bent outwardly from the peripheral portion of the front cover 6 such that a plurality of inlet holes 64 are defined next to the corresponding air guiding fins 63, and the air guiding fins 63 surround the inlet holes 64. The air guiding fins 63 extend generally towards the cooling fan 7, so that they are at a predetermined angle of (.THETA.1) to a reference plane (V), which is perpendicular to the rotating shaft 8 or with which the front cover 6 is coincident (see FIG. 6), wherein the predetermined angle (.THETA.1) is greater than 90 degrees. Furthermore, the front cover 6 defines at its outer edge two opposite first cutouts 621 which are capable of engaging with the sheaths 51, 52 of the mounting collar 5, so as to fix the front cover 6 to the mounting collar 5 which is in turn fixed to the housing 1, thus closing the front opening 10 of the housing 1. Furthermore, the front cover 6 defines a plurality of second cutouts 622, which are smaller than the first cutouts 621, corresponding to the hooks 12 of the housing 1. As the front cover 6 is coupled to the housing 1 by the mounting collar 5, the hooks 12 of the housing are fitted into the second cutouts 622 of the front cover 6 to snap the front cover 6, thereby facilitating the front cover 6 being coupled to the housing 1. Still furthermore, the front cover 6 defines a plurality of fixing holes 65, through which a plurality of screws can be engaged with other portions of the housing 1 (not shown), so that the front cover 6 can be fixed more firmly. While the front cover 6 is being coupled to the housing 1 by the mounting collar 5, the second end 89 of the rotating shaft 8 can be inserted through the central hole 61 of the central hub 60 of the front cover 6, wherein a bearing (not shown) may be provided in the central hub 60 of the front cover 6 and fitted with the second end 89 of the rotating shaft 8.

The cooling fan 7 defines a central hole 70, into which the second end 89 of the rotating shaft 8 extending out of the central hole 61 of the front cover 6 can be fitted, so that the cooling fan 7 is attached to and rotated together with the rotating shaft 8.

Figure 4:
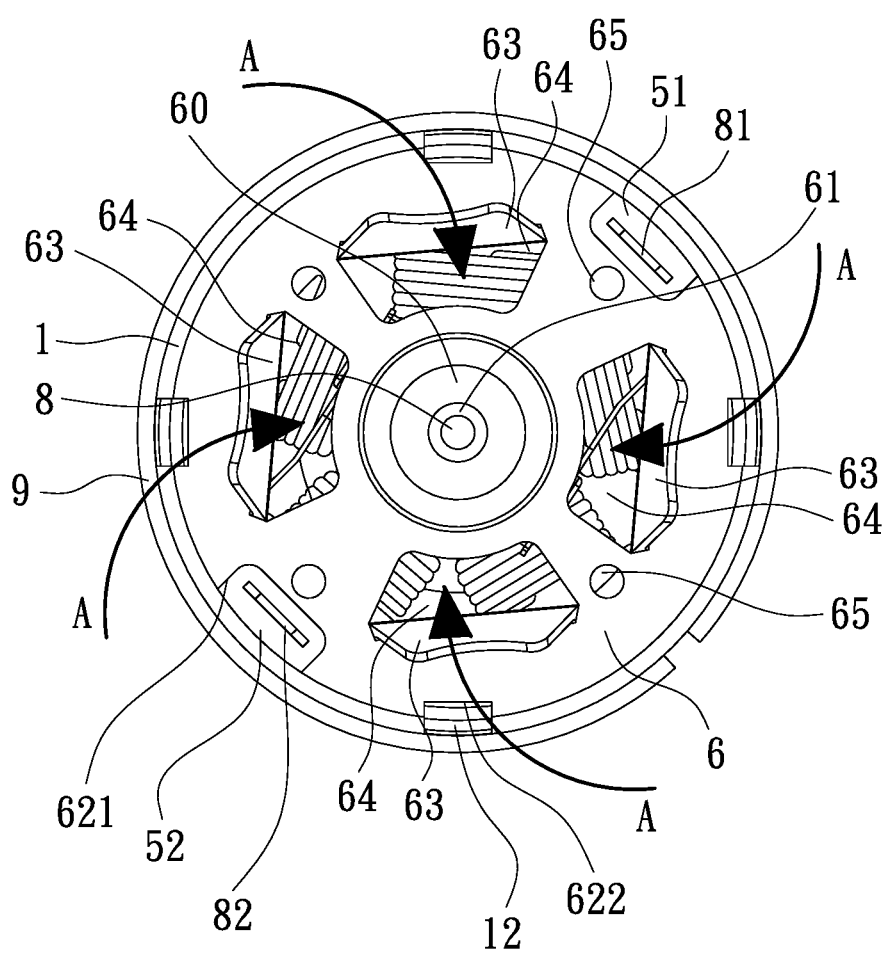
FIG. 4 shows a working view of the motor, which demonstrates the air current being guided by the air guiding furs to enter the associated inlet holes of the front cover for dissipating the heat generated in the motor.
Figure 5:
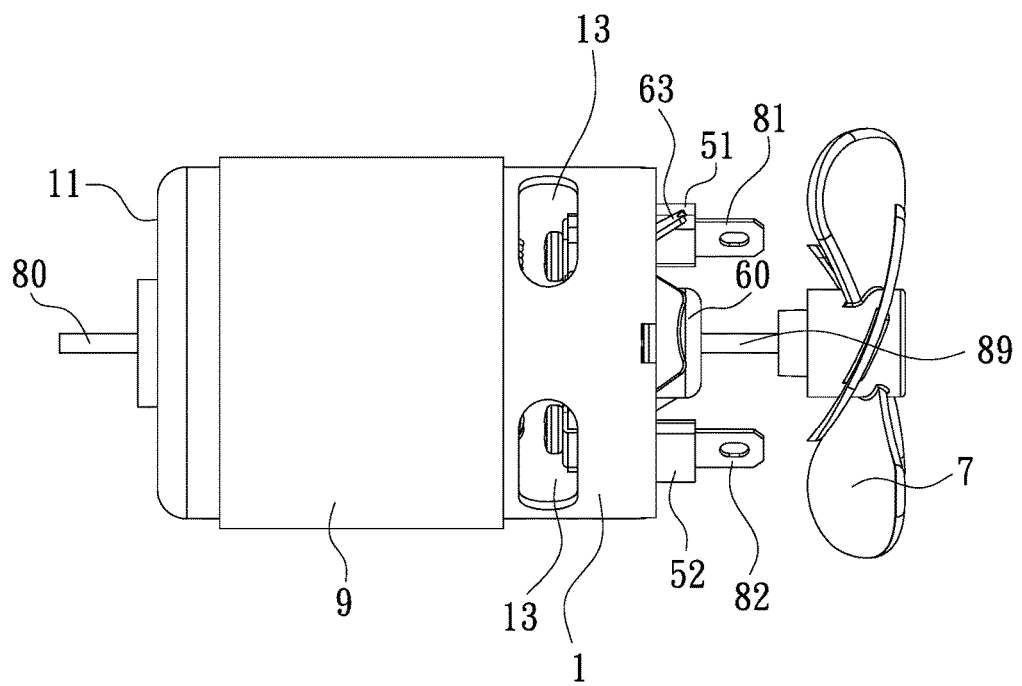
FIG. 5 shows a plan view of the motor.
Figure 7:
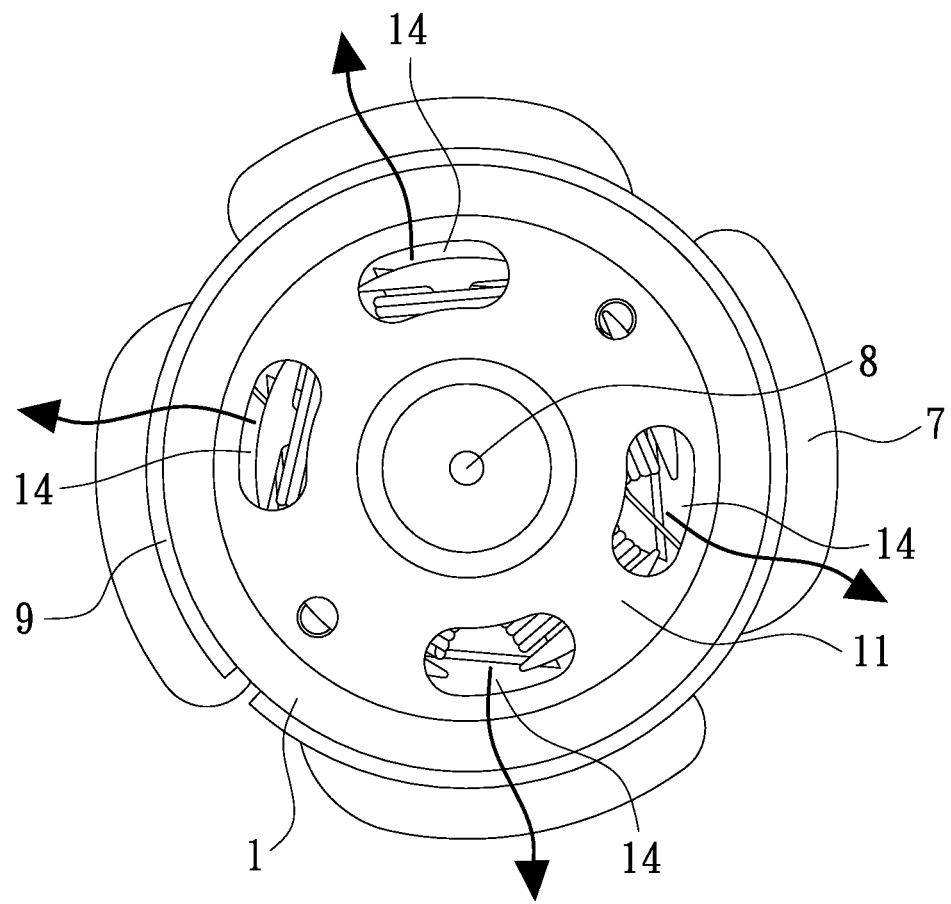
FIG. 7 shows a working view of the motor, which demonstrates that the air current can flow out of the motor's housing via the outlet holes thereof to take away the heat generated in the motor.

FIGS. 2 and 3 show one embodiment of the motor being assembled from the housing 1, the mounting collar 5, the front cover 6, and the cooling fan 7. When the motor is started, the cooling fan 7 can be rotated together with the rotating shaft 8 to generate a whirling, ongoing air current towards the front cover 5, so that the air at the right side of the cooling fan 7 can be forced to flow into the left side of the cooling fan 7 (see FIG. 5). In particular, the air current can enter the inner space 15 of the housing 1 more easily, and the heat generated in the housing 1 can be dissipated effectively through multiple paths (see FIGS. 4 and 6). A central portion of the air current generated by the cooling fan 7 can be guided by the air guiding fins 63 of the front cover 6 to pass through the associated inlet holes 64 and thus to enter the inner space 15 of the housing 1. While the motor is running, the central portion of the air current may follow a first airflow path (A) to dissipate the heat generated in the housing 1 (see FIGS. 4 and 6). In this embodiment, the air current which has entered the housing 1 can flow out of the housing 1 via the outlet holes 14 and the communication holes 13 (see FIGS. 6 and 7). An outer portion of the air current generated by the cooling fan 7, which is outside the area surrounded by the air guiding fins 63 of the front cover 6, can flow along the outer surface of the housing 1 or the sleeve 9; namely, the outer portion of the air current may follow a second airflow path (B) to cool down the temperature of the housing 1 (see HG 6) and thus to facilitate dissipation of the heat generated in the housing 1. The two airflow paths (A), (B) allow the heat generated in the housing 1 to dissipate more effectively, so that the motor can be prevented from burning out.

As a summary, the air guiding fins 63 and the associated inlet holes 64 of the front cover 6 allow the motor of the present invention to provide an airflow path (A) via which a central portion of the air current generated by the cooling fan 7 enters the housing 1 to dissipate the heat generated in the housing 1. In addition, the motor of the present invention provides another airflow path (B) via which an outer portion of the air current flows along the outer surface of the housing 1 to lower the temperature of the housing 1 and thus to increase the capacity of dissipating the heat generated in the housing 1. Through multiple paths for heat dissipation, heat is not easy to accumulate in the housing 1 of the motor; therefore, maximum power output of the motor can be achieved, and the performance and service life of the motor can be increased. Even though the motor is operated in a high-temperature environment, it will not burn out. These features render the motor of the present invention useful and inventive.

I claim:

1. A motor including a housing, a front cover, a rotating shaft, and a cooling fan, wherein the housing defines therein an inner space with a front opening and has a rear closure wall opposite to the front opening, the rear closure wall defining a central hole and a plurality of outlet holes; the front cover, which is substantially disk-shaped, closes the front opening of the housing and has a central hub defining a central hole and has a peripheral portion formed around the central hub; the rotating shaft is mounted across the inner space of the housing, the rotating shaft having a first end which is inserted through the central hole of the rear closure wall and having a second end which is inserted through the central hole of the hub of the front cover; the cooling fan is fixed to the second end of the rotating shaft, so that the cooling fan is rotated together with the rotating shaft; wherein the improvement comprises:

the front cover is pressed to form a plurality of air guiding fins, which are bent from the peripheral portion of the front cover such that a plurality of inlet holes are defined next to the corresponding air guiding fins; the housing defines at least one communication hole at its surrounding wall, wherein the front cover is coupled to the housing through a mounting collar which has two sheaths and two mounting tubes, the two sheaths extending from one peripheral edge of the mounting collar and parallel to a central axis of the mounting collar, the mounting tubes extending from an opposite peripheral edge of the mounting collar and parallel to the central axis of the mounting collar, wherein the two sheaths allow two electrical terminal blades provided in the housing to insert therethrough, while the two mounting tubes allow two fixing dowel rods provided in the housing to slide therein; whereby one portion of an air current generated by the cooling fan can be guided by the air guiding fins to pass through the inlet holes of the front cover and thus to enter the inner space of the housing and finally to flow out of the housing via the communication hole and the outlet holes for dissipating the heat generated in the housing.

2. The motor of claim 1, wherein the front cover defines at its outer edge two opposite first cutouts which are capable of engaging with the sheaths of the mounting collar, so as to fix the front cover in place.

3. The motor of claim 2, wherein the housing is provided with a plurality of hooks at its front edge which defines the front opening, and the front cover defines a plurality of second cutouts, the hooks capable of being inserted through the second cutouts to snap the front cover.

4. The motor of claim 3, wherein the front cover defines a plurality of fixing holes, through which a plurality of screws are engaged with other portions of the housing, so that the front cover can be fixed more firmly.

* * * * *